(12) United States Patent
LeCrone et al.

(10) Patent No.: US 11,768,605 B2
(45) Date of Patent: Sep. 26, 2023

(54) SYNCHRONOUS TO SEMI-SYNCHRONOUS OUT-OF-BAND I/O

(71) Applicant: EMC IP Holding Company LLC, Hopkinton, MA (US)

(72) Inventors: Douglas E. LeCrone, Hopkinton, MA (US); Paul A. Linstead, Shrewsbury, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 171 days.

(21) Appl. No.: 17/235,323

(22) Filed: Apr. 20, 2021

(65) Prior Publication Data

US 2022/0334728 A1    Oct. 20, 2022

(51) Int. Cl.
*G06F 3/06* (2006.01)

(52) U.S. Cl.
CPC ............ *G06F 3/0613* (2013.01); *G06F 3/067* (2013.01); *G06F 3/0614* (2013.01); *G06F 3/0653* (2013.01); *G06F 3/0659* (2013.01); *G06F 3/0679* (2013.01)

(58) Field of Classification Search
CPC .... G06F 3/0613; G06F 3/0614; G06F 3/0653; G06F 3/0659; G06F 3/067; G06F 3/0679
See application file for complete search history.

(56) References Cited

U.S. PATENT DOCUMENTS

| | | | |
|---|---|---|---|
| 8,261,029 B1* | 9/2012 | Marshak | G06F 3/0613 |
| | | | 711/158 |
| 2008/0244035 A1* | 10/2008 | Horie | G06F 3/0619 |
| | | | 709/217 |
| 2016/0342349 A1* | 11/2016 | Borlick | G06F 3/0634 |
| 2021/0232331 A1* | 7/2021 | Kannan | G06F 3/0631 |

OTHER PUBLICATIONS

Julius, Elroy P., and William David Tucker. "Guaranteed delivery of semi-synchronous IP-based communication." (2005). (Year: 2005).*

* cited by examiner

*Primary Examiner* — Nicholas J Simonetti
(74) *Attorney, Agent, or Firm* — Muirhead and Saturnelli, LLC (57) ABSTRACT

Handling I/O operations between a storage system and a host includes initiating a direct data transfer for each of the I/O operations that initially excludes other processes from using a CPU of the host, setting a first timer for each of the direct data transfers, converting at least some of the direct transfers to semi-synchronous I/O operations that release the CPU for use by other processes and transfer data directly between the storage system and the host in response to the first timer expiring prior to completion of a corresponding one of the direct data transfers, and setting a second timer that corresponds to an expected completion of the semi-synchronous I/O operation. The direct data transfers may exchange data between the host and cache memory of the storage system. The direct data transfers may be performed using a high speed connection between the storage system and the host.

24 Claims, 6 Drawing Sheets

SYNCHRONOUS TO SEMI-SYNCHRONOUS OUT-OF-BAND I/O

TECHNICAL FIELD

This application relates to the field of computer systems and storage systems therefor and, more particularly, to the field of direct high speed I/O between computer systems and storage systems.

BACKGROUND OF THE INVENTION

Host processor systems may store and retrieve data using a storage system containing a plurality of host interface units (I/O modules), disk drives, and disk interface units (disk adapters). The host systems access the storage systems through a plurality of channels provided therewith. Host systems provide data and access control information through the channels to the storage system and the storage system provides data to the host systems also through the channels. The host systems do not address the disk drives of the storage system directly, but rather, access what appears to the host systems as a plurality of logical disk units. The logical disk units may or may not correspond to any one of the actual disk drives. Allowing multiple host systems to access the single storage system allows the host systems to share data stored therein.

In some instances, high speed direct synchronous I/O operations may be performed between a host and a storage system. The high speed direct synchronous I/O operations are facilitated by a special high speed connection between the host and the storage system and by special components that directly access cache memory data of the storage system for direct transfers of data with the host. Having the I/O operation be direct and synchronous provides efficiencies by avoiding significant overhead associated with asynchronous I/O operations, which use tasks that are swapped in and out, data passed between software modules, etc. Moreover, if successful, the time for a high speed direct synchronous I/O operation is far less than the time that would be used to schedule an asynchronous I/O task, swap to one or more other tasks, transfer data between software modules, etc.

During the direct synchronous high speed I/O operation, the CPU is idle or otherwise not being used for other work while the system waits for a result of initiating the direct data transfer. This is not an issue when the direct synchronous high speed I/O operation is successful. However, when the high speed I/O operation fails for any reason, such as the requested data not being in the cache memory of the storage system, then a separate I/O operation for the same data needs to be performed asynchronously using conventional mechanisms, such as using ANSI FC-SB-3 Single-Byte Command Code Sets-3 Mapping Protocol for Fibre Channel for the transfer. In such a case, the initial attempt at performing the high speed I/O operation has, in fact, increased the overall amount of time it takes to perform the I/O operation.

Accordingly, it is desirable to provide a mechanism that allows the use of high speed I/O operations in a way that does not always increase the time for the I/O operation when a direct synchronous I/O operation initially fails.

SUMMARY OF THE INVENTION

According to the system described herein, handling I/O operations between a storage system and a host includes initiating a direct data transfer for each of the I/O operations that initially excludes other processes from using a CPU of the host, setting a first timer for each of the direct data transfers, converting at least some of the direct transfers to semi-synchronous I/O operations that release the CPU for use by other processes and transfer data directly between the storage system and the host in response to the first timer expiring prior to completion of a corresponding one of the direct data transfers, and setting a second timer that corresponds to an expected completion of the semi-synchronous I/O operation. The direct data transfers may exchange data between the host and cache memory of the storage system. A particular one of the direct data transfers may be converted to a semi-synchronous I/O operation in response to whether the first timer expiring is based on a cache miss and/or whether a length of time since initiating the particular one of the direct data transfers exceeds a predetermined value. The direct data transfers may be performed using a high speed connection between the storage system and the host. The high speed connection may be coupled to a smart network interface controller provided on a director board in the storage system. The smart network interface controller may include a system on a chip having a processor, memory, and non-volatile storage. The smart network interface controller may be a LimeStoneDX SLIC running a PCI PEX8733 Draco chip from Broadcom Corporation of San Jose, Calif. Handling I/O operations between a storage system and a host may also include performing an asynchronous I/O operation for data that was used in connection with initiating a particular one of the direct data transfers in response to the first timer expiring prior to completion of the particular one of the direct data transfers. The asynchronous I/O operation may be performed using an alternative connection between the host and the storage system. The alternative connection may be a Fibre Channel connection.

According further to the system described herein, a non-transitory computer readable medium contains software that handles I/O operations between a storage system and a host. The software includes executable code that initiates a direct data transfer for each of the I/O operations that initially excludes other processes from using a CPU of the host, executable code that sets a first timer for each of the direct data transfers, executable code that converts at least some of the direct transfers to semi-synchronous I/O operations that release the CPU for use by other processes and transfer data directly between the storage system and the host in response to the first timer expiring prior to completion of a corresponding one of the direct data transfers, and executable code that sets a second timer that corresponds to an expected completion of the semi-synchronous I/O operation. The direct data transfers may exchange data between the host and cache memory of the storage system. A particular one of the direct data transfers may be converted to a semi-synchronous I/O operation in response to whether the first timer expiring is based on a cache miss and/or whether a length of time since initiating the particular one of the direct data transfers exceeds a predetermined value. The direct data transfers may be performed using a high speed connection between the storage system and the host. The high speed connection may be coupled to a smart network interface controller provided on a director board in the storage system. The smart network interface controller may include a system on a chip having a processor, memory, and non-volatile storage. The smart network interface controller may be a LimeStoneDX SLIC running a PCI PEX8733 Draco chip from Broadcom Corporation of San Jose, Calif. The software may also include executable code that performs an asynchronous I/O operation for data that was used in connection with initiating a particular one of the direct transfers in response to the first timer expiring prior to completion of the particular one of the direct data transfers. The asynchronous I/O operation may be performed using an alternative connection between the host and the storage system. The alternative connection may be a Fibre Channel connection.

BRIEF DESCRIPTION OF THE DRAWINGS

Embodiments of the system are described with reference to the several figures of the drawings, noted as follows.

DETAILED DESCRIPTION OF VARIOUS EMBODIMENTS

The system described herein provides a mechanism to convert a direct synchronous I/O operation to a semi-synchronous I/O operation that allows the CPU to perform other work but still provides for direct data transfer in connection with the I/O operation.

Figure 1:
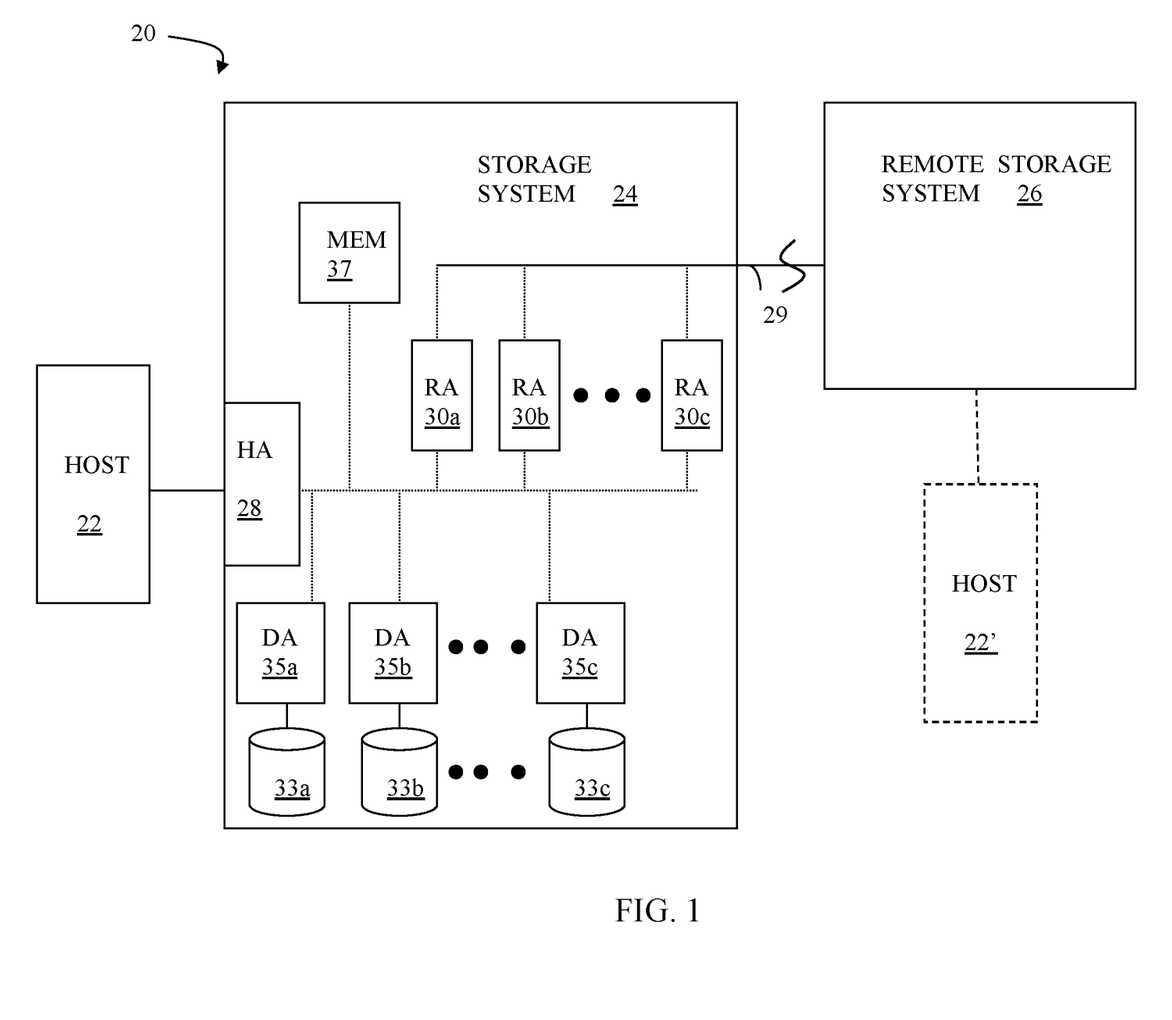
FIG. 1 is a schematic illustration showing a relationship between hosts and storage systems according to an embodiment of the system described herein.

FIG. 1 is a diagram 20 showing a relationship between a host 22 and a source storage system 24 that may be used in connection with an embodiment of the system described herein. In an embodiment, the source storage system 24 may be a PowerMax, Symmetrix, or VMAX storage system produced by Dell EMC of Hopkinton, Mass.; however, the system described herein may operate with other appropriate types of storage systems. Also illustrated is another (remote) storage system 26 that may be similar to, or different from, the source storage system 24 and may, in various embodiments, be coupled to the source storage system 24, using, for example, a network. The host 22 reads and writes data from and to the source storage system 24 via an HA 28 (host adapter), which facilitates an interface between the host 22 and the source storage system 24. Although the diagram 20 shows the host 22 and the HA 28, it will be appreciated by one of ordinary skill in the art that multiple host adaptors (possibly of different configurations) may be used and that one or more HAs may have one or more hosts coupled thereto.

In an embodiment of the system described herein, in various operations and scenarios, data from the source storage system 24 may be copied to the remote storage system 26 via a link 29. For example, transferring data may be part of a data mirroring or replication process that causes data on the remote storage system 26 to be identical to the data on the remote storage system 24. Although only the one link 29 is shown, it is possible to have additional links between the storage systems 24, 26 and to have links between one or both of the storage systems 24, 26 and other storage systems (not shown). The source storage system 24 may include a first plurality of remote adapter units (RA's) 30a, 30b, 30c. The RA's 30a-30c may be coupled to the link 29 and be similar to the HA 28, but are used to transfer data between the storage systems 24, 26.

The source storage system 24 may include one or more physical storage units (including disks, solid state storage devices, etc.), each containing a different portion of data stored on the source storage system 24. FIG. 1 shows the source storage system 24 having a plurality of physical storage units 33a-33c. The source storage system 24 (and/or remote storage system 26) may be provided as a stand-alone device coupled to the host 22 as shown in FIG. 1 or, alternatively, the source storage system 24 (and/or remote storage system 26) may be part of a storage area network (SAN) that includes a plurality of other storage systems as well as routers, network connections, etc. (not shown in FIG. 1). The storage systems 24, 26 may be coupled to a SAN fabric and/or be part of a SAN fabric. The system described herein may be implemented using software, hardware, and/or a combination of software and hardware where software may be stored in a computer readable medium and executed by one or more processors.

Each of the physical storage units 33a-33c may be coupled to a corresponding disk adapter unit (DA) 35a-35c that provides data to a corresponding one of the physical storage units 33a-33c and receives data from a corresponding one of the physical storage units 33a-33c. An internal data path exists between the DA's 35a-35c, the HA 28 and the RA's 30a-30c of the source storage system 24. Note that, in other embodiments, it is possible for more than one physical storage unit to be serviced by a DA and that it is possible for more than one DA to service a physical storage unit. The source storage system 24 may also include a global memory 37 that may be used to facilitate data transferred between the DA's 35a-35c, the HA 28 and the RA's 30a-30c as well as facilitate other operations. The memory 37 may contain task indicators that indicate tasks to be performed by one or more of the DA's 35a-35c, the HA 28 and/or the RA's 30a-30c, and may contain a cache for data fetched from one or more of the physical storage units 33a-33c.

The storage space in the source storage system 24 that corresponds to the physical storage units 33a-33c may be subdivided into a plurality of volumes or logical devices. The logical devices may or may not correspond to the storage space of the physical storage units 33a-33c. Thus, for example, the physical storage unit 33a may contain a plurality of logical devices or, alternatively, a single logical device could span both of the physical storage units 33a, 33b. Similarly, the storage space for the remote storage system 26 may be subdivided into a plurality of volumes or logical devices, where each of the logical devices may or may not correspond to one or more physical storage units of the remote storage system 26.

In some embodiments, another host 22' may be provided. The other host 22' is coupled to the remote storage system 26 and may be used for disaster recovery so that, upon failure at a site containing the host 22 and the source storage system 24, operation may resume at a remote site containing the remote storage system 26 and the other host 22'. In some cases, the host 22 may be directly coupled to the remote storage system 26, thus protecting from failure of the source storage system 24 without necessarily protecting from failure of the host 22.

Figure 2:
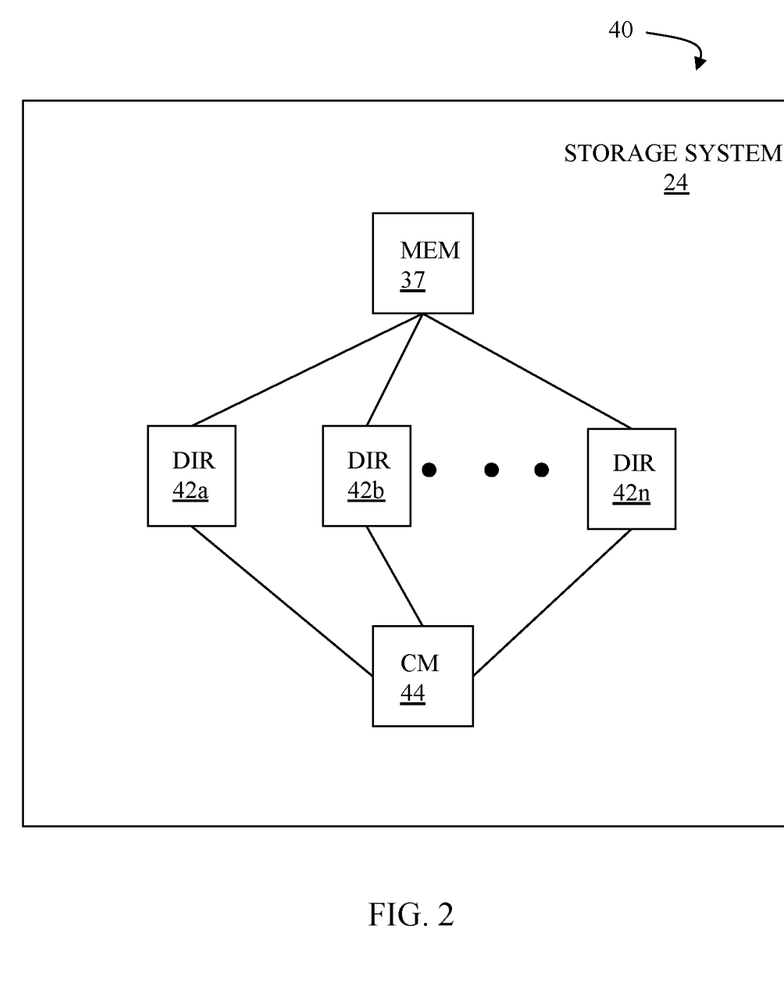
FIG. 2 is a schematic diagram illustrating a storage system where each of a plurality of directors are coupled to a memory according to an embodiment of the system described herein.

FIG. 2 is a schematic diagram 40 illustrating an embodiment of the source storage system 24 where each of a plurality of directors 42a-42n are coupled to the memory 37. Each of the directors 42a-42n represents at least one of the HA 28, RAs 30a-30c, or DAs 35a-35c. The diagram 40 also shows an optional communication module (CM) 44 that provides an alternative communication path between the directors 42a-42n. Each of the directors 42a-42n may be coupled to the CM 44 so that any one of the directors 42a-42n may send a message and/or data to any other one of the directors 42a-42n without needing to go through the memory 37. The CM 44 may be implemented using conventional MUX/router technology where one of the directors 42a-42n that is sending data provides an appropriate address to cause a message and/or data to be received by an intended one of the directors 42a-42n that is receiving the data. Some or all of the functionality of the CM 44 may be implemented using one or more of the directors 42a-42n so that, for example, the directors 42a-42n may be interconnected directly with the interconnection functionality being provided on each of the directors 42a-42n. In addition, one or more of the directors 42a-42n may be able to broadcast a message to all or at least some plurality of the other directors 42a-42n at the same time.

In some embodiments, one or more of the directors 42a-42n may have multiple processor systems thereon and thus may be able to perform functions for multiple discrete directors. In some embodiments, at least one of the directors 42a-42n having multiple processor systems thereon may simultaneously perform the functions of at least two different types of directors (e.g., an HA and a DA). Furthermore, in some embodiments, at least one of the directors 42a-42n having multiple processor systems thereon may simultaneously perform the functions of at least one type of director and perform other processing with the other processing system. In addition, all or at least part of the global memory 37 may be provided on one or more of the directors 42a-42n and shared with other ones of the directors 42a-42n. In an embodiment, the features discussed in connection with the source storage system 24 may be provided as one or more director boards having CPUs, memory (e.g., DRAM, etc.) and interfaces with Input/Output (I/O) modules.

Note that, although specific storage system configurations are disclosed in connection with FIGS. 1 and 2, it should be understood that the system described herein may be implemented on any appropriate platform. Thus, the system described herein may be implemented using a platform like that described in connection with FIGS. 1 and 2 or may be implemented using a platform that is somewhat or even completely different from any particular platform described herein.

A storage area network (SAN) may be used to couple one or more host systems with one or more storage systems in a manner that allows reconfiguring connections without having to physically disconnect and reconnect cables from and to ports of the devices. A storage area network may be implemented using one or more switches to which the storage systems and the host systems are coupled. The switches may be programmed to allow connections between specific ports of devices coupled to the switches. A port that can initiate a data-path connection may be called an "initiator" port while the other port may be deemed a "target" port.

Figure 3:
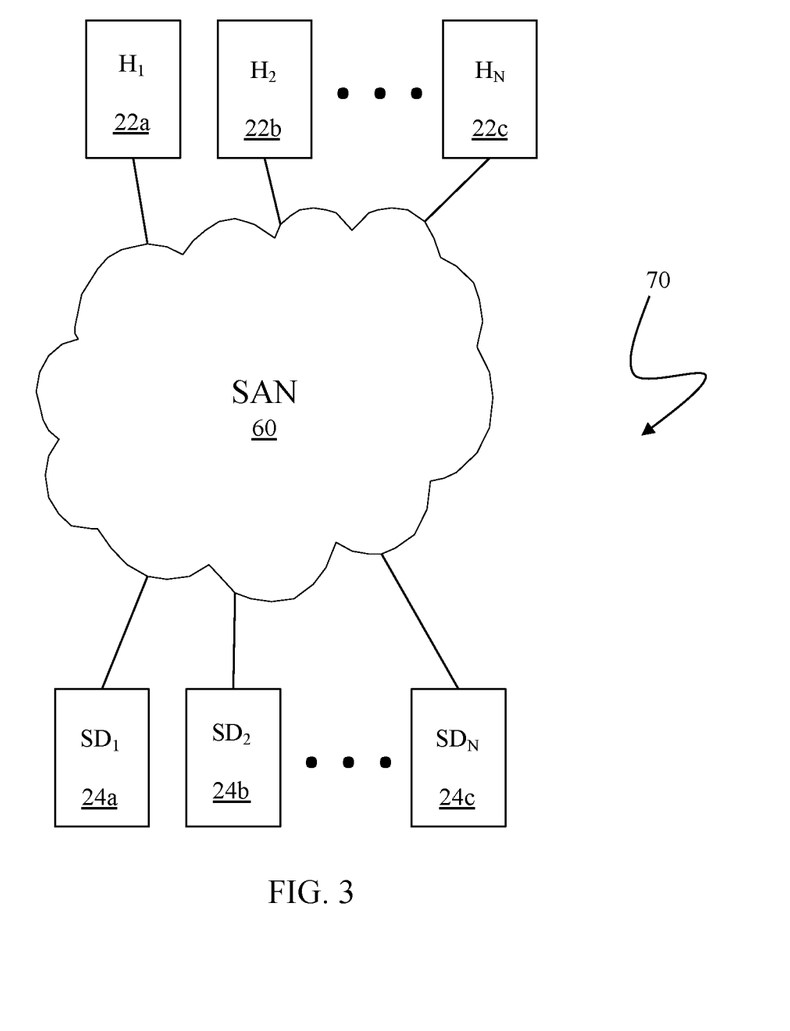
FIG. 3 is a schematic illustration showing a storage area network (SAN) providing a SAN fabric coupling a plurality of host systems to a plurality of storage systems that may be used in connection with an embodiment of the system described herein.

FIG. 3 is a schematic illustration 70 showing a storage area network (SAN) 60 providing a SAN fabric coupling a plurality of host systems ($H_1$-$H_N$) 22a-c to a plurality of storage systems ($SD_1$-$SD_N$) 24a-c that may be used in connection with an embodiment of the system described herein. Each of the devices 22a-c, 24a-c may have a corresponding port that is physically coupled to switches of the SAN fabric used to implement the storage area network 60. The switches may be separately programmed by one of the devices 22a-c, 24a-c or by a different device (not shown). Programming the switches may include setting up specific zones that describe allowable data-path connections (which ports may form a data-path connection) and possible allowable initiator ports of those configurations. For example, there may be a zone for connecting the port of the host 22a with the port of the storage system 24a. Upon becoming activated (e.g., powering up), the host 22a and the storage system 24a may send appropriate signals to the switch(es) of the storage area network 60, and each other, which then allows the host 22a to initiate a data-path connection between the port of the host 22a and the port of the storage system 24a. Zones may be defined in terms of a unique identifier associated with each of the ports, such as such as a world-wide port name (WWPN).

Figure 4:
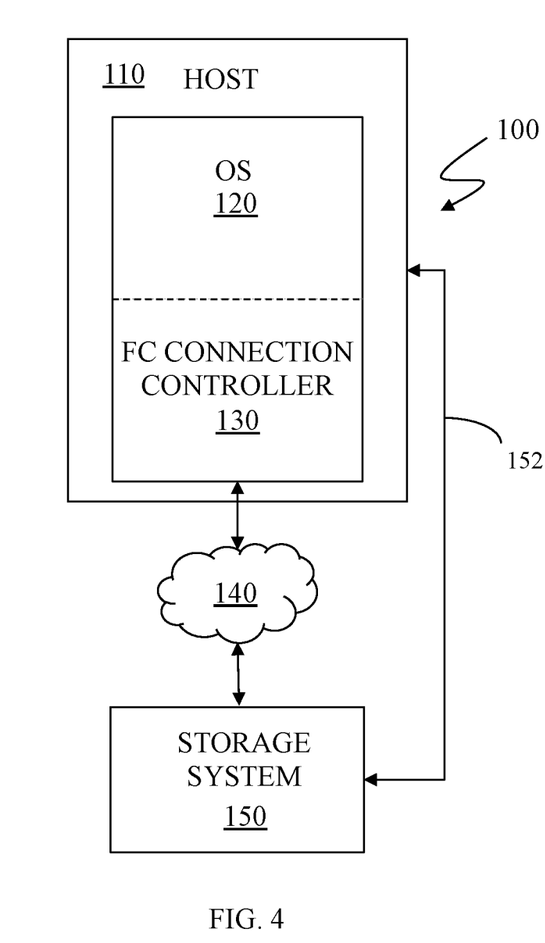
FIG. 4 is a schematic illustration showing a host system and a storage system according to an embodiment of the system described herein.

FIG. 4 is a diagram 100 showing a controller 130 for providing a communication connection between a host 110 and a storage system 150 according to an embodiment of the system described herein. The host 110 is similar to the hosts 22, 22', discussed above and the storage system 150 is similar to the storage systems 24, 26, discussed above. In an embodiment, the host 110 may be a computer running Linux, Windows, Mac OS, z/OS or some other appropriate operating system 120. The I/O processing on the host 110 may cooperate with a Fibre Channel controller 130 to enable I/O operations with the storage system 150. The controller 130 may send and receive data to and from the storage system 150 using a connection mechanism 140, that may include a network (such as the Internet, and appropriate connection thereof). The storage system 150 may include physical storage volumes and/or logical volumes and may be a storage array, such as Dell EMC Corporation's VMAX or Symmetrix data storage facility. The controller 130 may act as an I/O subsystem providing appropriate communication capability, such as ANSI FC-SB-3 Single-Byte Command Code Sets-3 Mapping Protocol for Fibre Channel. The storage system 150 may include features and/or components enabling communication with the host 110. For a discussion of features and implementations of storage system communications and suitable Fibre channel protocols operating therewith on z/Architecture computing systems, see J. Entwistle, "IBM System z10 FICON Express8 FCP Channel Performance Report," Technical paper, August 2009, 27 pp., which is incorporated herein by reference.

It is noted that various components of the system illustrated by the diagram 100 may be emulated. For further discussion of emulation of I/O computing components, see U.S. Pat. No. 9,665,502 to Jones et al., issued on May 30, 2017 and entitled "Virtual I/O Hardware" and U.S. Pat. No. 9,170,904 to LeCrone et al., issued on Oct. 27, 2015 and entitled "I/O Fault Injection Using Simulated Computing Environments," which are both incorporated herein by reference. Accordingly, in various embodiments, the system described herein provides for use of a channel emulator to emulate data transfer paths in I/O operations, and in which the channel emulator may simulate a host channel to provide I/O connectivity with an I/O device and may provide for the I/O connectivity using different channel protocols.

The connection mechanism 140 may provide Fibre Channel connectivity or may include an Internet connection and/or possibly some other types of connection(s). In an embodiment herein, the connection mechanism 140 may be directly incompatible with a Fibre Channel connection and/or conventional protocols used thereon. The incompatibility may be hardware incompatibility, software incompatibility, or both. Such connection mechanism 140 may not support a direct Fibre Channel connection but, instead, rely on an appropriate emulator for providing data in an appropriate format. It is further noted that where a Fibre Channel protocol emulation is being performed, the storage device 150 may include or be coupled to a corresponding Fibre Channel protocol emulator portion that may send and receive data to and from the connection mechanism 140 and also emulates, for example, a Fibre Channel FC0 physical layer for the benefit of the storage device 150. Thus, in cases involving emulation, both the host 110 and the storage device 150 may operate as if the devices 110, 150 were communicating using a Fibre Channel hardware connection. In other embodiments, the connection mechanism 140 may be directly compatible with Fibre Channel communication and may be implemented using, for example, a Fibre Channel cable and/or a connection mechanism such as the SAN 60, discussed above.

The host 110 and the storage system 150 may be coupled directly using a high speed link 152, such as an optical cable. As described in more detail herein, the high speed link 152 may be used by the host 110 to access data in the storage system 150 and provide a direct synchronous data path that bypasses the significant amount of overhead associated with a Fibre Channel connection using asynchronous communication, such as ANSI FC-SB-3 Single-Byte Command Code Sets-3 Mapping Protocol for Fibre Channel communication. The host 110 may access data directly from cache memory of the storage system 150 using the high speed link 152 and protocols such as zHyperlink. In some instances, data accesses via the high speed link 152 may be supplemented by a Fibre Channel connection that may be used for initializing communication over the high speed link 152 and/or as a fallback for I/O operations that cannot be handled by the high speed link 152, such as I/O operations when there is a cache miss where the high speed I/O times out, as described in more detail elsewhere herein.

Figure 5:
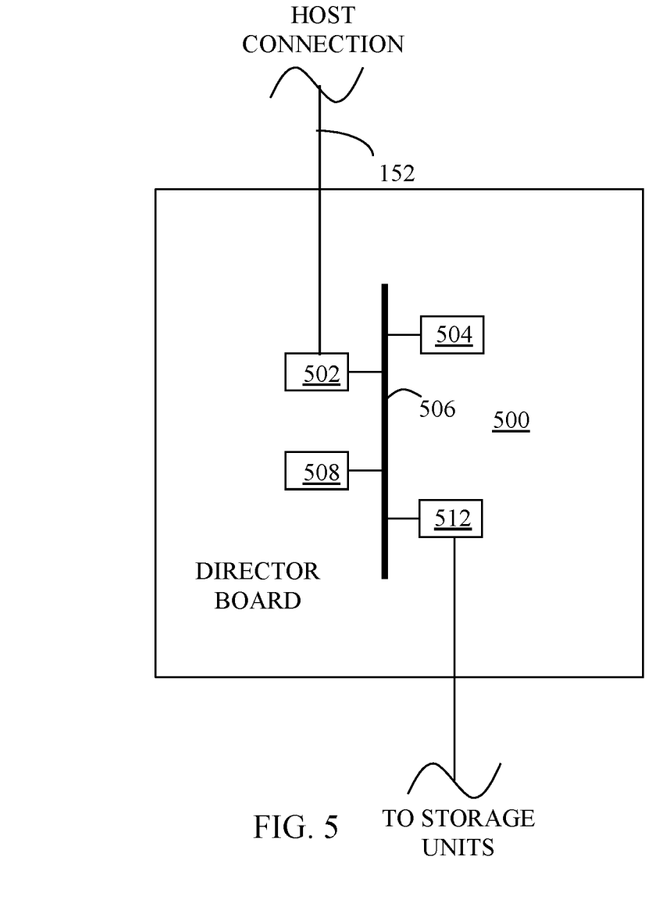
FIG. 5 is a schematic diagram of a director board having a smart network interface according to an embodiment of the system described herein.

Referring to FIG. 5, a director board 500 of the storage system 150 is shown in detail as including a connection component 502 coupled to the high speed link 152. The director board 500 includes a smart network interface controller 504 that communicates with the connection component 502 and possibly with other components of the storage system 150, as explained in more detail elsewhere herein. The connection component 502 provides connectivity between the host 110 and the storage system 150 via the high speed link 152. In an embodiment herein, the smart network interface controller 504 is a LimeStoneDX SLIC running a PCI PEX8733 Draco chip from Broadcom Corporation of San Jose, Calif., although other appropriate smart network interface devices could be used instead, including devices provided by other vendors such as Eternity Networks, Marvel, Napatech/Intel, Netronome, Solarflare, and Huawei. The smart network interface controller 504 includes a system on a chip having a processor, memory, non-volatile storage, etc. where the processor may be programmed in a conventional manner to provide significant functionality, including the functionality described herein.

Communication between the connection component 502 and the smart network interface controller 504 may be provided by a PCIe bus 506 that also provides communication for other components of the director board 500, including a processor 508 and a disk interface 512. Note that it is possible to use one or more different mechanisms to provide communication for the components of the director board, including any appropriate on-board interconnection bus or fabric, such as Gen-Z. There may be other components on the director board 500 (not shown), such as one or more additional processors, non-volatile memory, RAM, etc. The disk interface 512 controls/accesses one or more of the physical storage units of the storage system 150 (like the physical storage units 33a-33c of the storage system 24, described above) by exchanging control/status information and data therewith.

Data that is exchanged between the host 110 and the storage system 150 passes through the connection component 502, the smart network interface controller 504 and the disk interface 512 to be stored on and read from the physical storage units of the storage device 150. In some embodiments, the processor 508 is used to read and write data from and to the smart network interface controller 504 and the connection component 502. Thus, for example, data that is received from the host 110 is passed from the connection component 502 to the smart network interface controller 504 and is then read from the smart network interface controller 504 by the processor 508 that transfers the data to the disk interface 512. The disk interface 512 transfers the data to the storage units of the storage system 150. In other embodiments, a P2P (PCIe peer copy) transfer is initiated between the smart network interface controller 504 and the disk interface 512. The P2P transfer allows data to be transferred directly between the smart network interface controller 504 to the disk interface 512 without using the processor 508 (or any other processor). Other types of direct data transfer between the smart network interface controller 504 and the disk interface 512 may also be used.

Figure 6:
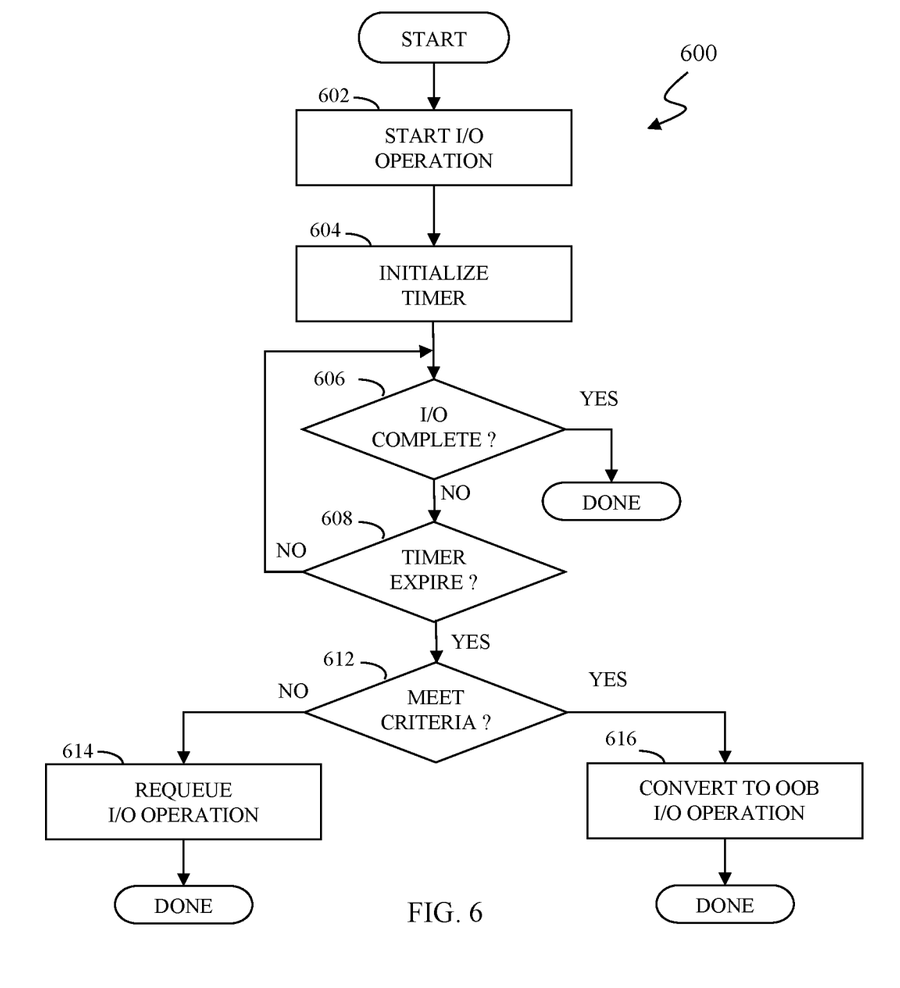
FIG. 6 is a flow diagram illustrating processing performed in connection with handling an expired timer for a synchronous I/O operation according to an embodiment of the system described herein.

Referring to FIG. 6, a flow diagram 600 illustrates processing performed by the host 110 in connection with performing an I/O operation using the high speed link 152. Processing begins at a step 602 where a direct synchronous I/O operation is started using, for example, components of the director board 500, including the connection component 502 and the smart network interface controller 504. For a direct transfer I/O operation, data is transferred directly between cache memory of the storage system 150 and the host 110. Following the step 602 is a step 604 where a timer is initialized. The timer is used to limit an amount of time allotted for synchronously providing the direct synchronous I/O operation. If the direct synchronous I/O operation via the high speed link 152 has not completed by the time the timer expires, the direct synchronous I/O operation is possibly transformed into a semi-synchronous I/O operation, as described in more detail elsewhere herein.

Following the step 604 is a step 606 where it is determined if the direct synchronous I/O operation via the high speed link 152 has completed (i.e., the director board 500 has generated a status result indicating that data for the I/O has been successfully transmitted or received). If the direct synchronous I/O operation has completed, then processing is complete. Otherwise, control transfers from the test step 606 to a test step 608 where it is determined if the timer that was initialized at the step 604, discussed above, has expired. If not, then control transfers back to the step 606, discussed above, for another iteration. Otherwise, control transfers from, the test step 608 to a test step 612 where it is determined if the I/O operation meets a criteria for out-of-band (OOB) semi-synchronous conversion and handling, which is discussed in more detail elsewhere herein. If the I/O does not meet the criteria for OOB conversion, then control transfers from the test step 612 to a step 614 where an I/O operation with the same data is requeued using an alternative mechanism, such as performing an asynchronous I/O operation with the same data via the Fibre Channel connection 140. Following the step 614, processing is complete.

If it is determined at the step 612 that the I/O operation meets a criteria for OOB conversion and handling, then control transfer from the step 612 to a step 616 where the direct synchronous I/O operation is converted to an OOB semi-synchronous I/O operation. The determination at the step 612 may include any appropriate criteria, such as whether the timeout is based on a cache miss or perhaps a length of time since initiating the direct synchronous I/O operation. Processing at the step 616 is described in more detail elsewhere herein.

Figure 7:
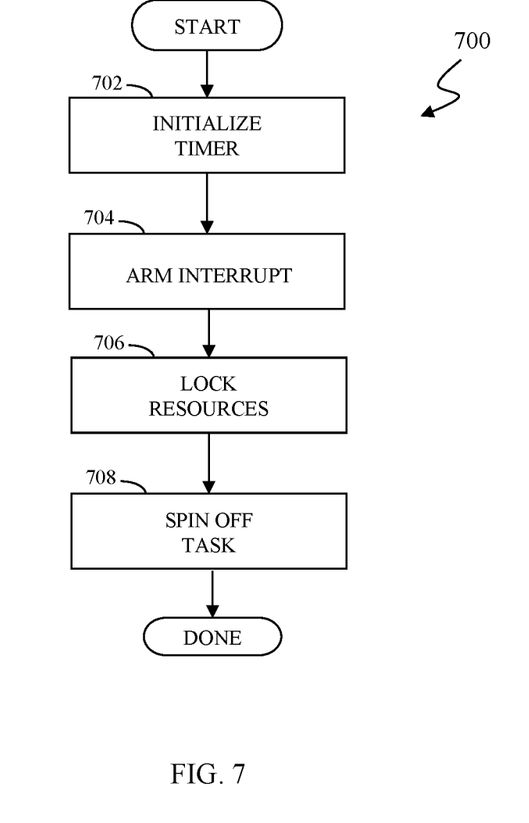
FIG. 7 is a flow diagram illustrating processing performed in connection with converting a synchronous I/O operation to a semi-synchronous out-of-band I/O operation according to an embodiment of the system described herein.

Referring to FIG. 7, a flow diagram 700 illustrates in more detail processing performed at the step 616, described above, where the direct synchronous I/O operation is converted to an out-of-band semi-synchronous I/O operation that frees up the CPU of the host 110 for other processing while efficiently completing the I/O operation by preserving the direct I/O transfer initiated by the direct synchronous I/O operation. Processing for the flow diagram 700 may be performed by the Fibre Channel connection controller 130 or other I/O components of the host 110 and begins at a step 702 where a new timer is started for the semi-synchronous process. The new timer that is set at the step 702 is different from the timer that is set at the step 604, described above. In an embodiment herein, the new timer is initialized at the step 702 to accommodate an expected amount of time to complete the I/O operation. For example, if it is expected that the I/O timed out at the step 608, discussed above, based on a storage system cache miss, then the timer is initialized at the step 702 to enough time to allow data to be fetched from the disk and placed in the cache memory of the storage system 150.

Following the step 702 is a step 704 where an interrupt is armed so that, when the timer expires, an interrupt routine is called, as described in more detail elsewhere herein. Following the step 704 is a step 706 where resources associated with the I/O operation (e.g., memory in the host 100 expected to receive data directly from the cache memory of the storage system 150) are locked to prevent modification by other processes. In some embodiments, if the direct I/O operation is successful, the system will unlock the resources that are locked at the step 706. Alternatively, it is possible to provide separate processing that unlocks the resources following a successful I/O operation. Following the step 706 is a step 708 where the direct I/O operation is spun off as an independent, out-of-band, process, thereby freeing the CPU of the host 110 for other processing. Note that the interrupt that was armed at the step 704, discussed above, will initiate an interrupt process when the timer, set at the step 702, expires.

Figure 8:
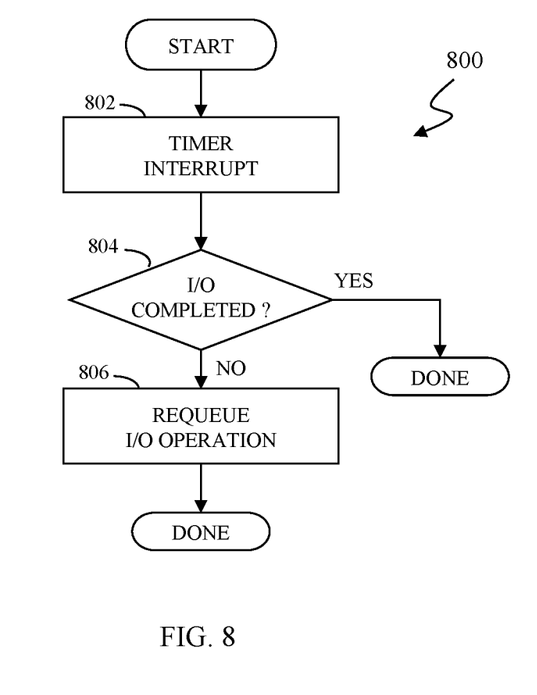
FIG. 8 is a flow diagram illustrating processing performed in connection with servicing a timer interrupt used in connection with a semi-synchronous out-of-band I/O operation according to an embodiment of the system described herein.

Referring to FIG. 8, a flow diagram 800 illustrates interrupt processing that is performed in response to the interrupt that results from the timer that was set at the step 704 expiring. Processing begins at a first step 802 where the timer expires to cause the interrupt. Following the step 802 is a test step 804 where it is determined if the direct I/O operation, which was spun out as a separate out-of-band process at the step 708, discussed above, has completed. Note that, since a direct data transfer was initiated at the step 602, discussed above, then completion of the I/O indicates that data was directly transferred between the cache memory of the storage system 150 and the host 110. If it is determined at the step 804 that the direct I/O operation had finished, then processing is complete. Otherwise, control transfers from the test step 804 to a step 806 where an I/O operation with the same data is requeued using an alternative mechanism, such as performing an asynchronous I/O operation with the same data via the Fibre Channel connection 140. Following the step 806, processing is complete.

Various embodiments discussed herein may be combined with each other in appropriate combinations in connection with the system described herein. Additionally, in some instances, the order of steps in the flow diagrams, flowcharts and/or described flow processing may be modified, where appropriate. Further, various aspects of the system described herein may be implemented using software, hardware, a combination of software and hardware and/or other computer-implemented modules or devices having the described features and performing the described functions. The system may further include a display and/or other computer components for providing a suitable interface with a user and/or with other computers.

Software implementations of the system described herein may include executable code that is stored in a non-transitory computer-readable medium and executed by one or more processors. The computer-readable medium may include volatile memory and/or non-volatile memory, and may include, for example, a computer hard drive, ROM, RAM, flash memory, portable computer storage media such as a CD-ROM, a DVD-ROM, an SD card, a flash drive or other drive with, for example, a universal serial bus (USB) interface, and/or any other appropriate tangible or non-transitory computer-readable medium or computer memory on which executable code may be stored and executed by a processor. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method of handling I/O operations between a storage system and a host, comprising:
    initiating synchronous direct data transfers for the I/O operations, the synchronous direct data transfers initially excluding other processes from using a CPU of the host, the synchronous direct data transfers using a first connection between the host and the storage system;
    setting a first timer for each of the direct data transfers;
    transferring data of each of the synchronous direct data transfers that is unsent after the first timer expires using semi-synchronous I/O operations that release the CPU for use by other processes and transfer the data directly via the first connection between the storage system and the host;
    setting a second timer that corresponds to an expected completion of the semi-synchronous I/O operation; and transferring data of each of the semi-synchronous I/O operations that is unsent after the second timer expires using asynchronous I/O operations that transfer the data via a second connection between the storage system and the host, the second connection being separate from the first connection.

2. A method, according to claim 1, wherein the direct data transfers exchange data between the host and cache memory of the storage system.

3. A method, according to claim 1, wherein a particular one of the direct data transfers is converted to a semi-synchronous I/O operation in response to at least one of: whether the first timer expiring is based on a cache miss or whether a length of time since initiating the particular one of the direct data transfers exceeds a predetermined value.

4. A method, according to claim 1, wherein the the first connection is a high speed connection between the storage system and the host.

5. A method, according to claim 4, wherein the high speed connection is coupled to a smart network interface controller provided on a director board in the storage system.

6. A method, according to claim 5, wherein the smart network interface controller includes a system on a chip having a processor, memory, and non-volatile storage.

7. A method, according to claim 6, wherein the smart network interface controller is a LimeStoneDX SLIC running a PCI PEX8733 Draco chip from Broadcom Corporation of San Jose, Calif.

8. A computer system, according to claim 1, wherein the direct data transfers exchange data between the computer system and cache memory of the storage system.

9. A computer system, according to claim 1, wherein a particular one of the direct data transfers is converted to a semi-synchronous I/O operation in response to at least one of:
whether the first timer expiring is based on a cache miss or whether a length of time since initiating the particular one of the direct data transfers exceeds a predetermined value.

10. A method, according to claim 1, wherein the second connection is a Fibre Channel connection.

11. A non-transitory computer readable medium containing software that handles I/O operations between a storage system and a host, the software comprising:
executable code that initiates synchronous direct data transfers for the I/O operations, the synchronous direct data transfers initially excluding other processes from using a CPU of the host, the synchronous direct data transfers using a first connection between the host and the storage system;
executable code that sets a first timer for each of the synchronous direct data transfers;
executable code that transfers data of each of the synchronous direct data transfers that is unsent after the first timer expires using semi-synchronous I/O operations that release the CPU for use by other processes and transfer the data directly via the first connection between the storage system and the host;
executable code that sets a second timer that corresponds to an expected completion of the semi-synchronous I/O operation; and
executable code that transfers data of each of the semi-synchronous I/O operations that is unsent after the second timer expires using asynchronous I/O operations that transfer the data via a second connection between the storage system and the host, the second connection being separate from the first connection.

12. A non-transitory computer readable medium, according to claim 11, wherein the direct data transfers exchange data between the host and cache memory of the storage system.

13. A non-transitory computer readable medium, according to claim 11, wherein a particular one of the direct data transfers is converted to a semi-synchronous I/O operation in response to at least one of: whether the first timer expiring is based on a cache miss or whether a length of time since initiating the particular one of the direct data transfers exceeds a predetermined value.

14. A non-transitory computer readable medium, according to claim 11, wherein the the first connection is a high speed connection between the storage system and the host.

15. A non-transitory computer readable medium, according to claim 14, wherein the high speed connection is coupled to a smart network interface controller provided on a director board in the storage system.

16. A non-transitory computer readable medium, according to claim 15, wherein the smart network interface controller includes a system on a chip having a processor, memory, and non-volatile storage.

17. A non-transitory computer readable medium, according to claim 16, wherein the smart network interface controller is a LimeStoneDX SLIC running a PCI PEX8733 Draco chip from Broadcom Corporation of San Jose, Calif.

18. A non-transitory computer readable medium, according to claim 11, wherein the second connection is a Fibre Channel connection.

19. A computer system, comprising:
a processor;
a controller, coupled to the processor, that communicates with a storage system coupled to the computer system; and
a non-transitory computer readable medium coupled to the processor and to the controller and containing software that handles I/O operations between a storage system and the computer system, the software including executable code that initiates synchronous direct data transfers for the I/O operations, the synchronous direct data transfers initially excluding other processes from using the processor, the synchronous direct data transfers using a first connection between the computer system and the storage system, executable code that sets a first timer for each of the synchronous direct data transfers, executable code that transfers data of each of the synchronous direct data transfers that is unsent after the first timer expires using semi-synchronous I/O operations that release the CPU for use by other processes and transfer the data directly via the first connection between the storage system and the computer system, executable code that sets a second timer that corresponds to an expected completion of the semi-synchronous I/O operation, and executable code that transfers data of each of the semi-synchronous I/O operations that is unsent after the second timer expires using asynchronous I/O operations that transfer the data via a second connection between the storage system and the controller of the computer system, the second connection being separate from the first connection.

20. A computer system, according to claim 19, wherein the first connection is a high speed connection between the storage system and the computer system.

21. A computer system, according to claim 20, wherein the high speed connection is coupled to a smart network interface controller provided on a director board in the storage system.

22. A computer system, according to claim 21, wherein the smart network interface controller includes a system on a chip having a processor, memory, and non-volatile storage.

23. A computer system, according to claim 22, wherein the smart network interface controller is a LimeStoneDX SLIC running a PCI PEX8733 Draco chip from Broadcom Corporation of San Jose, Calif.

24. A computer system, according to claim 19, wherein the second connection is a Fibre Channel connection.

* * * * *